(12) United States Patent
Lee et al.

(10) Patent No.: US 10,374,831 B2
(45) Date of Patent: Aug. 6, 2019

(54) STITCHING MULTI-DOMAIN LSPS IN HIERARCHICAL SDN ARCHITECTURE

(71) Applicant: Futurewei Technologies, Inc., Plano, TX (US)

(72) Inventors: Young Lee, Plano, TX (US); James N. Guichard, Hollis, NH (US); Dhruv Dhody, Bangalore (IN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/689,869

(22) Filed: Aug. 29, 2017

(65) Prior Publication Data
US 2019/0068403 A1 Feb. 28, 2019

(51) Int. Cl.
*H04L 12/46* (2006.01)
*H04L 12/24* (2006.01)
*H04L 12/701* (2013.01)

(52) U.S. Cl.
CPC ...... *H04L 12/4633* (2013.01); *H04L 12/4641* (2013.01); *H04L 41/12* (2013.01); *H04L 45/00* (2013.01)

(58) Field of Classification Search
CPC ......... H04L 12/24; H04L 12/46; H04L 12/66; H04L 12/462; H04L 12/4625; H04L 12/4633; H04L 12/4637; H04L 12/4641; H04L 12/40091; H04L 12/40097; H04L 41/12; H04L 45/04; H04L 2012/5618; H04L 45/00; H04B 10/271
See application file for complete search history.

(56) References Cited

U.S. PATENT DOCUMENTS

| | | | | |
|---|---|---|---|---|
| 8,351,418 | B2* | 1/2013 | Zhao | H04L 12/185 370/351 |
| 9,178,801 | B1* | 11/2015 | Guichard | H04L 12/6418 |
| 9,197,508 | B2* | 11/2015 | Vasseur | H04L 41/147 |
| 9,450,864 | B2* | 9/2016 | Zhao | H04L 45/42 |
| 10,009,287 | B2* | 6/2018 | Djukic | H04L 47/782 |
| 10,050,806 | B2* | 8/2018 | Chen | H04L 12/4633 |

(Continued)

OTHER PUBLICATIONS

Dugeon, et al., "A Backward Recursive PCE-initiated inter-domain LSP Setup," draft-dugeon-brpc-stateful-00, Mar. 13, 2017, 16 pages.

(Continued)

*Primary Examiner* — Tri H Phan
(74) *Attorney, Agent, or Firm* — Conley Rose, P.C.

(57) ABSTRACT

A method of establishing an end-to-end tunnel for a virtual network extending across multiple domains using a first network controller element managing a first domain is provided. The method includes receiving a request from a second network controller element managing the first network controller element for an intra-domain locally-learned tunnel identifier (LLTI), sending an instruction to an egress network element of the first domain to generate the intra-domain LLTI in accordance with the request, receiving the intra-domain LLTI from the egress network element in accordance with the instruction, and sending the intra-domain LLTI to an ingress network element of the first domain. A method of establishing an end-to-end tunnel for a virtual network extending across multiple domains using an inter-domain LLTI is provided.

26 Claims, 12 Drawing Sheets

(56) References Cited

U.S. PATENT DOCUMENTS

| | | | | |
|---|---|---|---|---|
| 10,218,600 | B2* | 2/2019 | Chen | H04L 45/122 |
| 2015/0188837 | A1* | 7/2015 | Djukic | H04L 47/782 |
| | | | | 709/226 |
| 2016/0087891 | A1* | 3/2016 | Kwon | H04L 45/741 |
| | | | | 370/392 |
| 2017/0070426 | A1* | 3/2017 | Chen | H04L 45/50 |
| 2017/0163443 | A1* | 6/2017 | Chen | H04L 12/4633 |
| 2017/0244628 | A1* | 8/2017 | Chen | H04L 45/122 |
| 2017/0289020 | A1* | 10/2017 | Zhao | H04L 45/04 |
| 2018/0131570 | A1* | 5/2018 | Lee | H04L 41/12 |
| 2018/0316596 | A1* | 11/2018 | Chen | H04L 45/04 |

OTHER PUBLICATIONS

Crabbe, et al., "PCEP Extensions for PCE-initiated LSP Setup in a Stateful PCE Model," draft-ietf-pce-pce-initiated-lsp-10, Jun. 22, 2017, 18 pages.

Sivabalan, et al., "PCEP Extensions for Segment Routing," draft-ietf-pce-segment-routing-09, Apr. 10, 2017, 21 pages.

Crabbe, et al., "PCEP Extensions for Stateful PCE," draft-ietf-pce-stateful-pce-21, Jun. 19, 2017, 54 pages.

Lee, et al., "PCEP Extensions for Establishing Relationships Between Sets of LSPs and Virtual Networks," draft-leedhody-pce-vn-association-02, Mar. 13, 2017, 13 pages.

Lee, et al., "PCEP Extensions for Stitching LSPs in Hierarchical Stateful PCE Model," draft-lee-pce-lsp-stitching-00.txt, Jun. 23, 2017, 14 pages.

Lee, et al., "PCEP Extensions for Stitching LSPs in Hierarchical Stateful PCE Model," draft-lee-pce-lsp-stitching-hpce-00.txt, Jun. 26, 2017, 14 pages.

Li, et al., "A Framework of MPLS Global Label," draft-li-mpls-global-label-framework-02, Jul. 3, 2014, 14 pages.

Chen, et al., "Path Computation Element Hierarchical Software Defined Network Control," U.S. Appl. No. 15/391,319, filed Dec. 27, 2016, 92 pages.

Chen, H., et al., "PCE Hierarchical SDNs" draft-chen-pce-h-sdns-02, May 4, 2017, 66 pages.

* cited by examiner

STITCHING MULTI-DOMAIN LSPS IN HIERARCHICAL SDN ARCHITECTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined network (SDN) is a networking paradigm that decouples network control and forwarding functions. The decoupling of the control plane from the data plane allows for centralization of network control, enabling effective policy administration and flexible management. The centralization of network control facilitates various network functionalities, such as network measurements, traffic engineering, enhanced quality of services, and enhanced access control. With the growing availability of SDN-enabled nodes and protocols, many organizations have started deploying SDN networks.

SUMMARY

In an embodiment, the disclosure includes a method to support establishing an end-to-end tunnel for a virtual network (VN) extending across multiple domains using a first network controller element managing a first domain. The method includes receiving a request from a second network controller element managing the first network controller element for an intra-domain locally-learned tunnel identifier (LLTI), sending an instruction to an egress network element of the first domain to generate the intra-domain LLTI in accordance with the request, receiving the intra-domain LLTI from the egress network element in accordance with the instruction, and sending the intra-domain LLTI to an ingress network element of the first domain.

In an embodiment, the first network controller element is a child path computational element (C-PCE) and the second network controller element is a parent path computational element (P-PCE). In an embodiment, the first network controller element is a provider network controller (PNC) and the second network controller element is a multi-domain service coordinator (MDSC). In an embodiment, the egress network element is a provider edge (PE) coupled to a customer edge (CE). In an embodiment, the ingress network element is an autonomous system boundary router (ASBR) coupled by an inter-domain link to an egress ASBR in a second domain upstream from the first domain. In an embodiment, the request includes an identifier corresponding to the end-to-end tunnel. In an embodiment, the intra-domain LLTI is received in a PCReport message modified to carry the intra-domain LLTI. In an embodiment, the first network controller element sends a second instruction to the ingress network element of the first domain to generate an inter-domain LLTI.

In an embodiment, the disclosure includes a method to support establishing an end-to-end tunnel for a virtual network (VN) extending across multiple domains using a first network controller element managing a first domain. The method includes receiving a request from a second network controller element managing the first network controller element for an inter-domain locally-learned tunnel identifier (LLTI), sending an instruction to an ingress network element of the first domain to generate the inter-domain LLTI in accordance with the request, receiving the inter-domain LLTI from the ingress network element in accordance with the instruction, and sending the inter-domain LLTI to the second network controller element so that the second network controller element is able to provide the inter-domain LLTI to an egress network element of a second domain upstream of the first domain.

In an embodiment, the first network controller element is a child path computational element (C-PCE) and the second network controller element is a parent path computational element (P-PCE). In an embodiment, the first network controller element is a provider network controller (PNC) and the second network controller element is a multi-domain service coordinator (MDSC). In an embodiment, the ingress network element is an autonomous system boundary router (ASBR) coupled by an inter-domain link to the egress network element of the second domain. In an embodiment, the egress network element of the second domain is an autonomous system boundary router (ASBR) coupled by an inter-domain link to the ingress network element of the first domain. In an embodiment, the request includes an identifier corresponding to the end-to-end tunnel. In an embodiment, the first network controller element sends a second instruction to a first domain egress network element to generate an intra-domain LLTI.

In an embodiment, the disclosure includes an ingress network element in a downstream domain utilizing an end-to-end tunnel for a virtual network (VN) extending across multiple domains. The ingress network element includes a receiver configured to receive an intra-domain locally-learned tunnel identifier (LLTI) from a first network controller element managing the downstream domain, where the intra-domain LLTI was generated by an egress network element in the downstream domain, and a data packet from an upstream egress network element in an upstream domain, and a transmitter operably coupled to the receiver, where the transmitter is configured to transmit the data packet toward the egress network element in the downstream domain using the intra-domain LLTI.

In an embodiment, the data packet is transmitted toward the egress network element in the downstream domain over an intra-domain link. In an embodiment, the data packet is received from the upstream egress network element in the upstream domain over an inter-domain link. In an embodiment, the intra-domain LLTI is received in a PCReport message modified to carry the intra-domain LLTI.

In an embodiment, the disclosure includes an egress network element in an upstream domain utilizing an end-to-end tunnel for a virtual network (VN) extending across multiple domains. The egress network element includes a receiver configured to receive an inter-domain locally-learned tunnel identifier (LLTI) from a first network controller element managing the upstream domain, where the inter-domain LLTI was generated by an ingress network element in a downstream domain, and a data packet from an intermediary network element in the upstream domain, and a transmitter operably coupled to the receiver, where the transmitter is configured to transmit the data packet to the ingress network element in the downstream domain using the inter-domain LLTI.

In an embodiment, the data packet is transmitted to the ingress network element over an inter-domain link. In an embodiment, the data packet is received from the egress network element over an intra-domain link. In an embodiment, the inter-domain LLTI is received in a modified version of a PCInitiate message.

In an embodiment, the disclosure includes a method of establishing an end-to-end tunnel for a virtual network (VN) extending across multiple domains using a first network controller element. The method includes receiving a request from a customer network controller (CNC) to establish the end-to-end tunnel for the VN extending across the multiple domains, sending an instruction to a second network controller element managing a downstream domain for an intra-domain LLTI and an inter-domain LLTI, receiving the inter-domain LLTI from the second network controller element, sending the inter-domain LLTI to a third network element managing an upstream domain, wherein the inter-domain LLTI corresponds to an inter-domain link extending between an egress network element of the upstream domain and an ingress network element of the downstream domain.

In an embodiment, the method further includes mapping a virtual network identifier (VN ID) and an access point (AP) identifier provided by the CNC to determine an ingress provider edge (PE) and an egress PE for the VN. In an embodiment, the method further includes determining a domain sequence for the end-to-end tunnel based on topology information, wherein the domain sequence identifies the upstream domain and the downstream domain.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods and apparatuses for establishing an end-to-end (E2E) tunnel for a virtual network (VN) extending across multiple domains in a hierarchical network architecture. In prior solutions, a global label assignment scheme is utilized to propagate data packets through the multi-domain network. In the global label assignment scheme, a central controller (e.g., a parent path computation element (P-PCE), a multi-domain service coordinator (MDSC), a software defined network (SDN) controller, etc.) generates and assigns labels to the network elements (e.g., autonomous system border router (ASBR), provider edge (PE), etc.). The labels are then used by the network elements to propagate the data packets within each domain as well as between domains. Thus, a network element higher in the hierarchy generates and assigns the labels to the network elements lower in the hierarchy in the global label assignment scheme.

In contrast to the prior solutions, the present disclosure provides a local label assignment scheme. In the local label assignment scheme, the network elements (e.g., ASBR, PE, etc.) generate and assign the labels used to propagate the data packets within each domain as well as between domains. As will be more fully explained below, a label used to propagate a data packet through a domain may be referred to as an intra-domain locally-learned tunnel identifier (LLTI). A label used to propagate a data packet between two domains may be referred to as an inter-domain LLTI. By using the local label assignment scheme, the processing burden on the central controller is reduced, which improves the scalability of the central controller. In addition, the techniques disclosed herein provide VN isolation because the E2E tunnel is not aggregated with other services and applications. Further, the E2E tunnel and label-switched path (LSP) stitching methods may be used for a particular VN member or for a VN where there is a single VN member for the VN.

Figure 1:
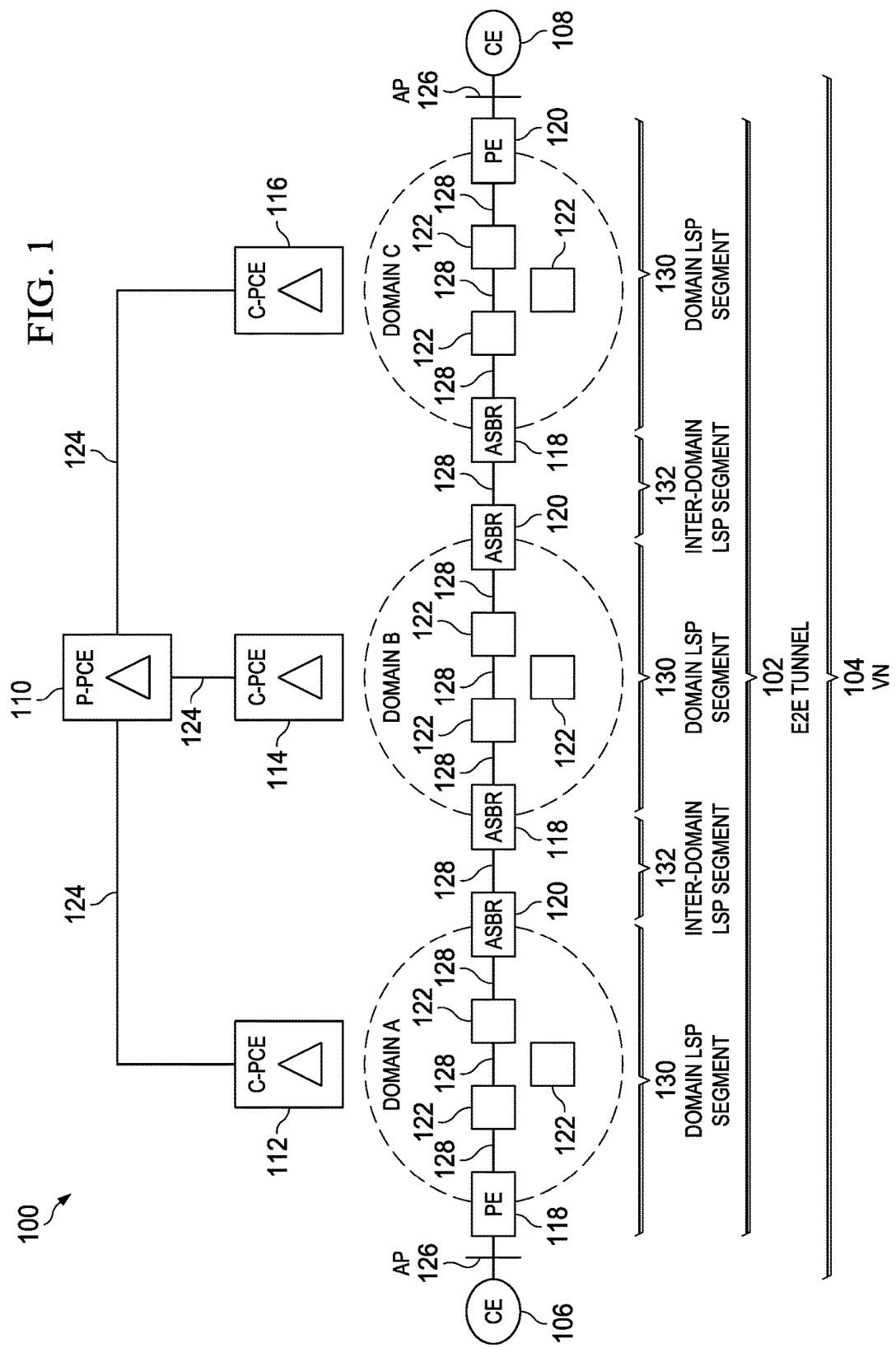
FIG. 1 is an embodiment of a hierarchical network suitable for creating an end-to-end tunnel for a virtual network passing through multiple domains.

FIG. 1 is an embodiment of a hierarchical network 100 suitable for creating an E2E tunnel 102 for a VN 104 passing through multiple domains, such as domain A, domain B, and domain C, and extending from one endpoint 106 (e.g., a source) to another endpoint 108 (e.g., a destination). As used herein, each of the endpoints may be referred to as a customer edge (CE). As shown, the hierarchical network 100 includes a central controller 110, child controllers 112, 114, 116, ingress network elements 118, egress network elements 120, and intermediate network elements 122.

The central controller 110 is the network element responsible for managing the child controllers 112, 114, 116, which are below the central controller 110 in the hierarchy of the hierarchical network 100. For purposes of illustration, in FIG. 1 the central controller 110 is depicted as a P-PCE operating in a path computational element protocol (PCEP) context. However, in an embodiment the central controller 110 may also be an MDSC operating in the abstraction and control of traffic engineered networks (ACTN) context. The central controller 110 may be coupled to the child controllers 112, 114, 116 via a link 124 comprising a wired connection, a wireless connection, or some combination thereof.

The child controllers 112, 114, 116 are the network elements each responsible for managing one of the domains through which the E2E tunnel 102 passes. In FIG. 1, child controller 112 is responsible for managing domain A, child controller 114 is responsible for managing domain B, and child controller 116 is responsible for managing domain C. While three child controllers 112, 114, 116 are depicted in FIG. 1, it should be understood that more or fewer child controllers may be included in the hierarchical network 100 in practical applications. For purposes of illustration, in FIG. 1 the child controllers 112, 114, 116 are depicted as a child path computation element (C-PCE) operating in the PCEP context. However, in an embodiment the child controllers 112, 114, 116 may also be a provider network controller (PNC) in the ACTN context. One or more of the controllers disclosed herein (e.g., central controller 110 and child controllers 112, 114, 116) may be referred to as a stateful controller (e.g., a stateful PCE).

The child controllers 112, 114, 116 are coupled to ingress network elements 118, egress network elements 120, and any intermediate network elements 122 in their respective domains A, B, C via a link (not shown) comprising a wired connection, a wireless connection, or some combination thereof. In an embodiment, one or both of the ingress network element 118 and the egress network element 120 is an ASBR.

The ingress network element 118 in domain A coupled to the endpoint 106 at the start of the E2E tunnel 102 may be referred to as a PE. Likewise, the egress network element 120 in domain C coupled to the endpoint 108 at the end of the E2E tunnel 102 may also be referred to as a PE. As shown in FIG. 1, an access point (AP) interface 126 is disposed between the endpoint 106 and the ingress network element 118 of domain A. Another AP interface 126 is disposed between the egress network element 120 of domain C and the endpoint 108.

Using some combination of ingress network elements 118, one or more intermediate network elements 122 (optional), and egress network elements 120, a path 128 (e.g., a LSP) may be established. The portion of the path 128 disposed within a domain (e.g., within domain A, within domain B, and within domain C) may be referred to as an intra-domain segment 130. The portion of the path 128 disposed between domains (e.g., between domain A and domain B, and between domain B and domain C) may be referred to as an inter-domain segment 132. As will be discussed more fully below, the path 128 is utilized to transmit data packets through the hierarchical network 100.

Figure 2:
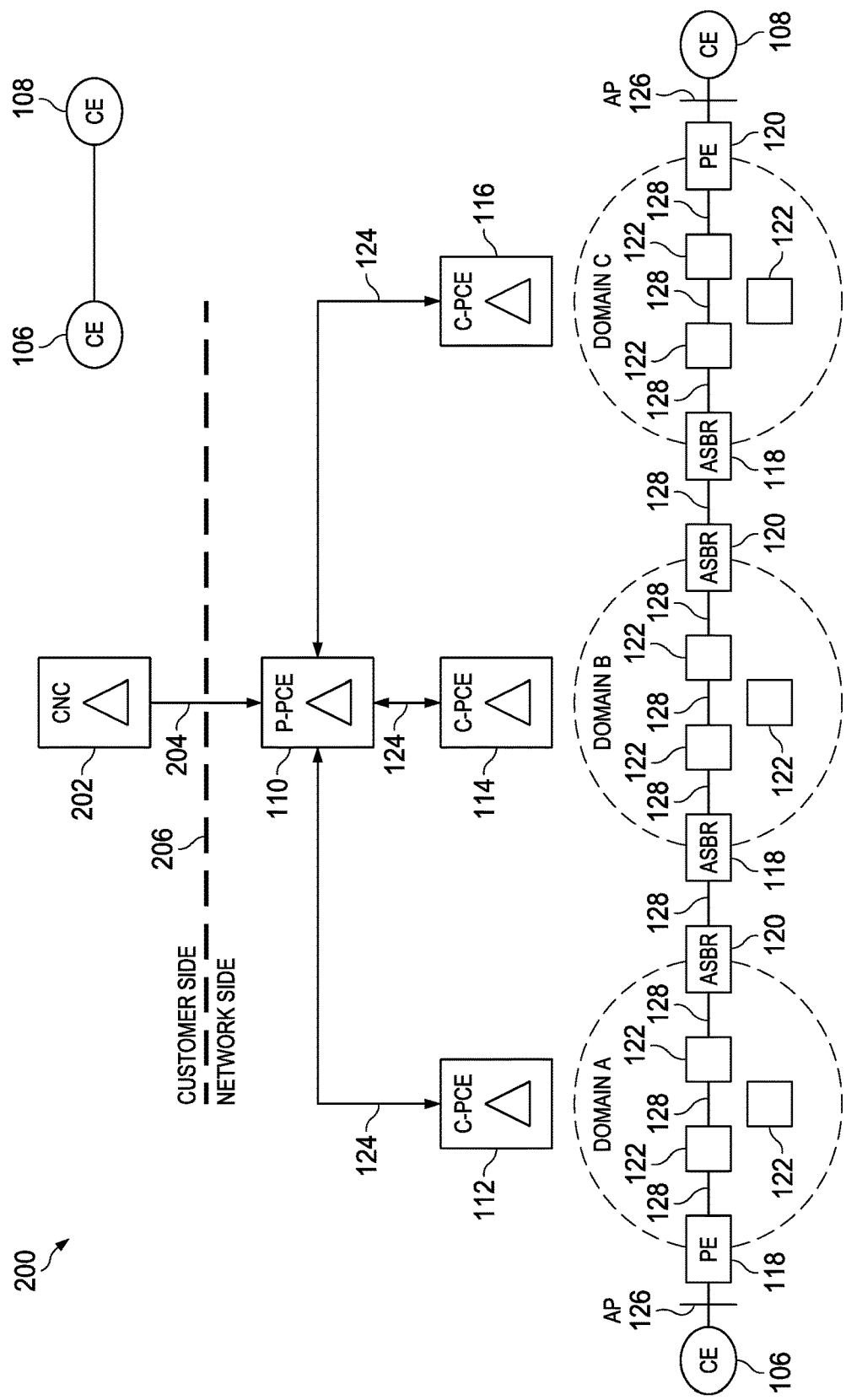
FIG. 2 is an embodiment of a hierarchical network suitable for creating an end-to-end tunnel for a virtual network passing through multiple domains.

FIG. 2 illustrates an embodiment of a hierarchical network 200 similar to the hierarchical network 100 of FIG. 1. As shown in FIG. 2, a customer network controller (CNC) 202 is coupled to the central controller 110 via link 204. Link 204 may be a wired connection, a wireless connection, or some combination thereof. The CNC 202 is disposed on a customer side of interface 206 and the central controller 110 is disposed on a network side of the interface 206. As such, the CNC 202 is managed by a customer while the central controller 110 is managed by a network administrator.

When the customer wants to have a VN created from one endpoint 106 to the other endpoint 108, the CNC 202 sends a request to the central controller 110. In an embodiment, the request is to establish an E2E tunnel for the VN extending across multiple domains. In an embodiment, the request includes a virtual network identifier (VN ID) and an AP ID. When the central controller 110 receives the request from the CNC 202, the central controller 110 maps the VN ID and the AP ID to determine the ingress network element 118 (e.g., the PE) coupled to the endpoint 106 and the egress network element 120 (e.g., the PE) coupled to the endpoint 108 associated with the E2E tunnel 102 in FIG. 1 that the customer has requested.

After the ingress network element 118 and the egress network element 120 have been determined, the central controller 110 determines the domain sequence for the E2E tunnel 102 based on network topology information. The domain sequence is the series of domains that will be used to create the VN requested by the customer and connect one endpoint 106 to the other endpoint 108. Thereafter, the central controller 110 configures the domain-level LSP.

Figure 3A:
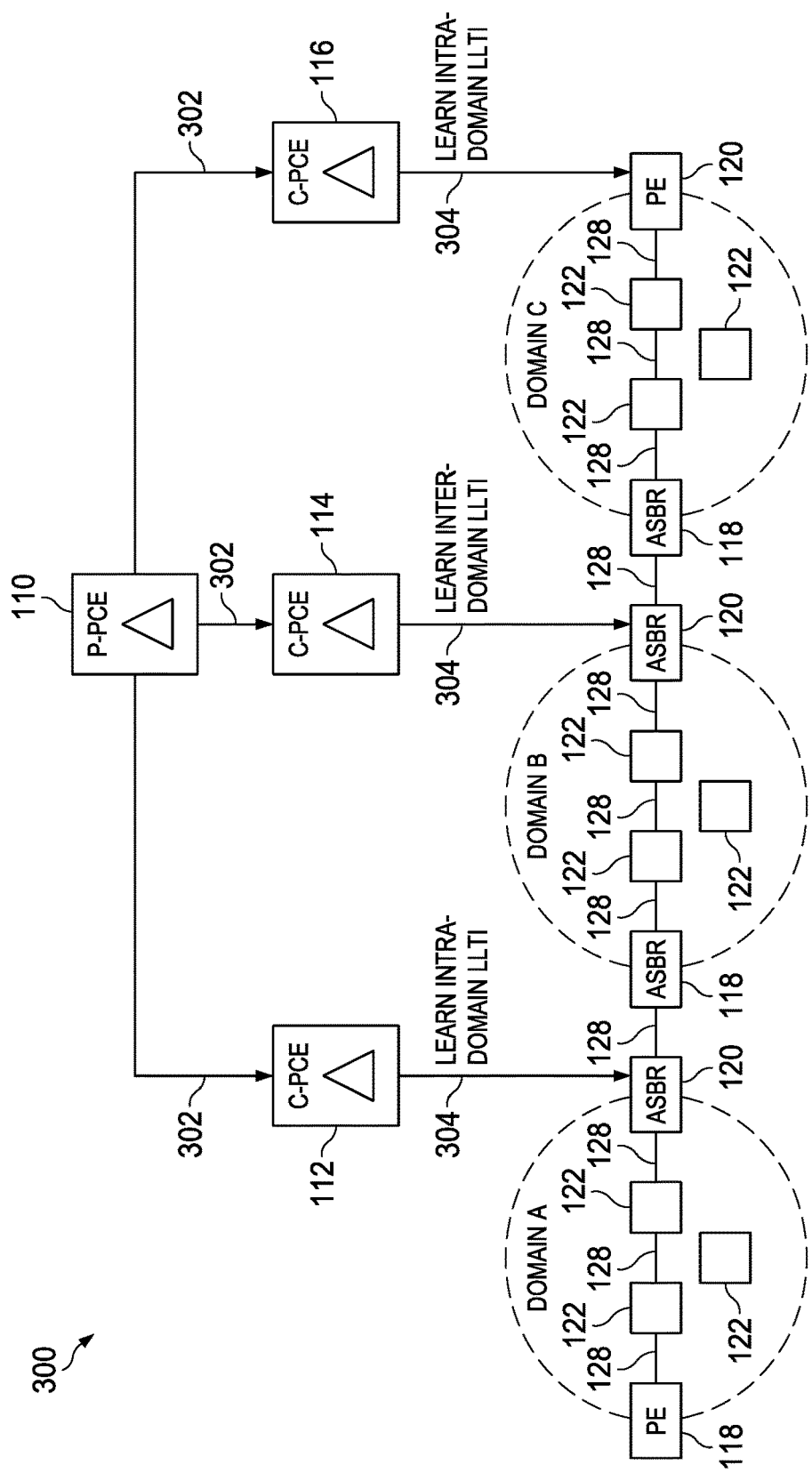
FIGS. 3A-3B collectively depict the manner in which intra-domain segments for the end-to-end tunnel are established.
Figure 3B:
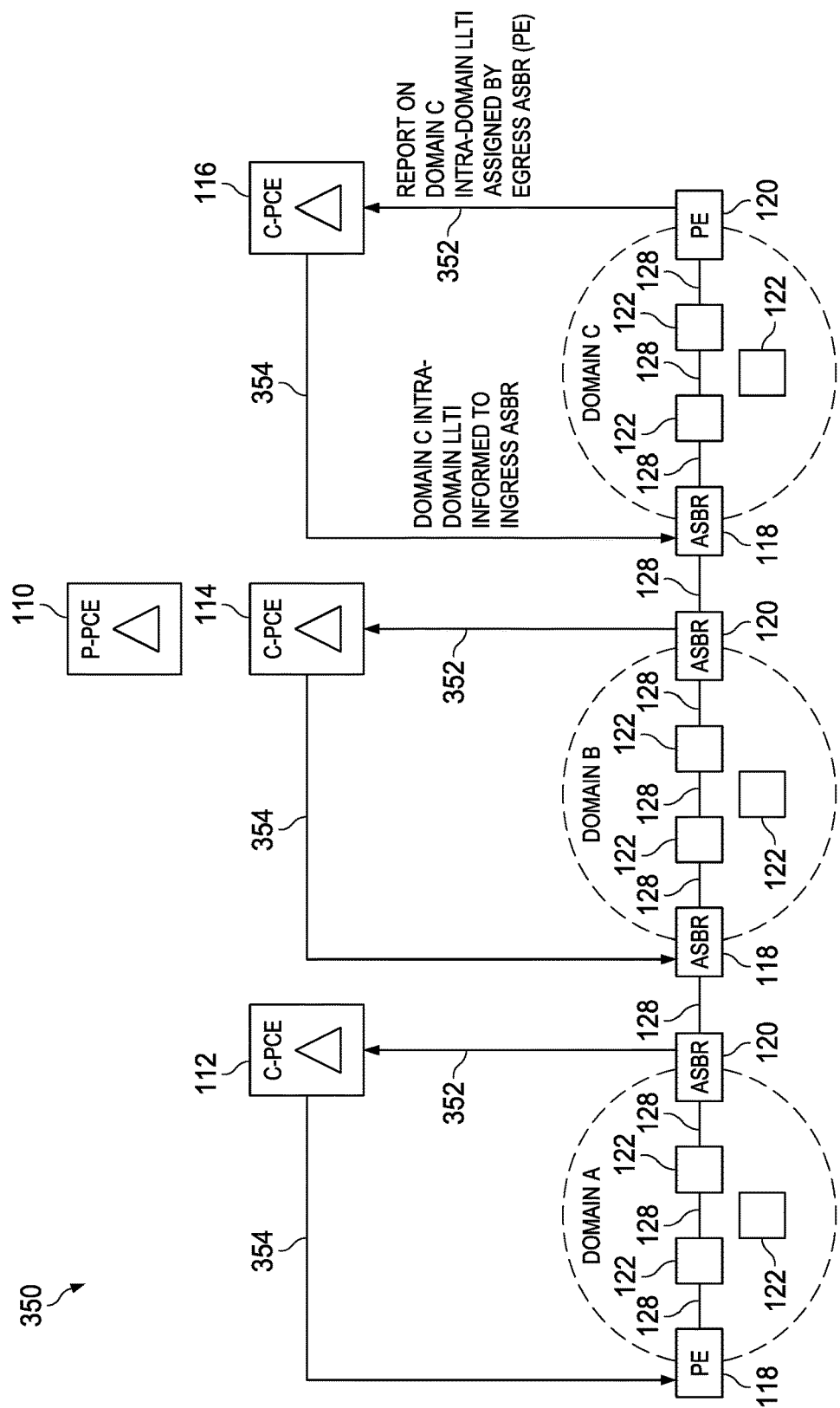

FIGS. 3A-3B illustrate embodiments of a hierarchical network 300, 350 similar to the hierarchical networks 100, 200 of FIGS. 1-2. FIGS. 3A-3B collectively depict the manner in which the intra-domain segments 130 of the E2E tunnel 102 of FIG. 1 are established from the perspective of the control plane. As shown in FIG. 3A, each child controller 112, 114, 116 receives a request 302 from the central controller 110 to learn an intra-domain LLTI. Thereafter, the child controller 112 sends an instruction 304 to generate the intra-domain LLTI to the egress network element 120 in domain A, the child controller 114 sends an instruction 304 to generate the intra-domain LLTI to the egress network element 120 in domain B, and the child controller 116 sends an instruction 304 to generate the intra-domain LLTI to the egress network element 120 in domain C. Upon receipt of the instruction 304, the egress network element 120 in domain A generates the intra-domain LLTI for domain A, the egress network element 120 in domain B generates the intra-domain LLTI for domain B, and the egress network element 120 in domain C generates the intra-domain LLTI for domain C. In an embodiment, the egress network element 120 stores the intra-domain LLTI that was generated.

As shown in FIG. 3B, the egress network element 120 for domain A sends a report 352 containing the intra-domain LLTI to child controller 112, the egress network element 120 for domain B sends a report 352 containing the intra-domain LLTI to child controller 114, and the egress network element 120 for domain C sends a report 352 containing the intra-domain LLTI to child controller 116. In an embodiment, the report 352 is a PCReport message modified to carry the intra-domain LLTI (e.g., a PCEP extension). Additional details about a PCReport message (a.k.a., PCRpt message) are described in Internet Engineering Task Force (IETF) Request for Comments (RFC) draft titled, "PCEP Extensions for Stateful PCE," by E. Crabbe, et al., published on Jun. 19, 2017, which is incorporated herein by reference.

Once the intra-domain LLTI has been received, child controller 112 sends a message 354 containing the intra-domain LLTI to the ingress network element 118 for domain A, child controller 114 sends a message 354 containing the intra-domain LLTI to the ingress network element 118 for domain B, and child controller 116 sends a message 354 containing the intra-domain LLTI to the ingress network element 118 for domain C. In an embodiment, the message containing the intra-domain LLTI may also be sent by one or more of the child controllers 112, 114, 116 to the central controller 110. Thereafter, each ingress network element 118 is able to use the inter-domain LLTI that was received to route data packets through its domain, which will be more fully explained below.

Figure 4A:
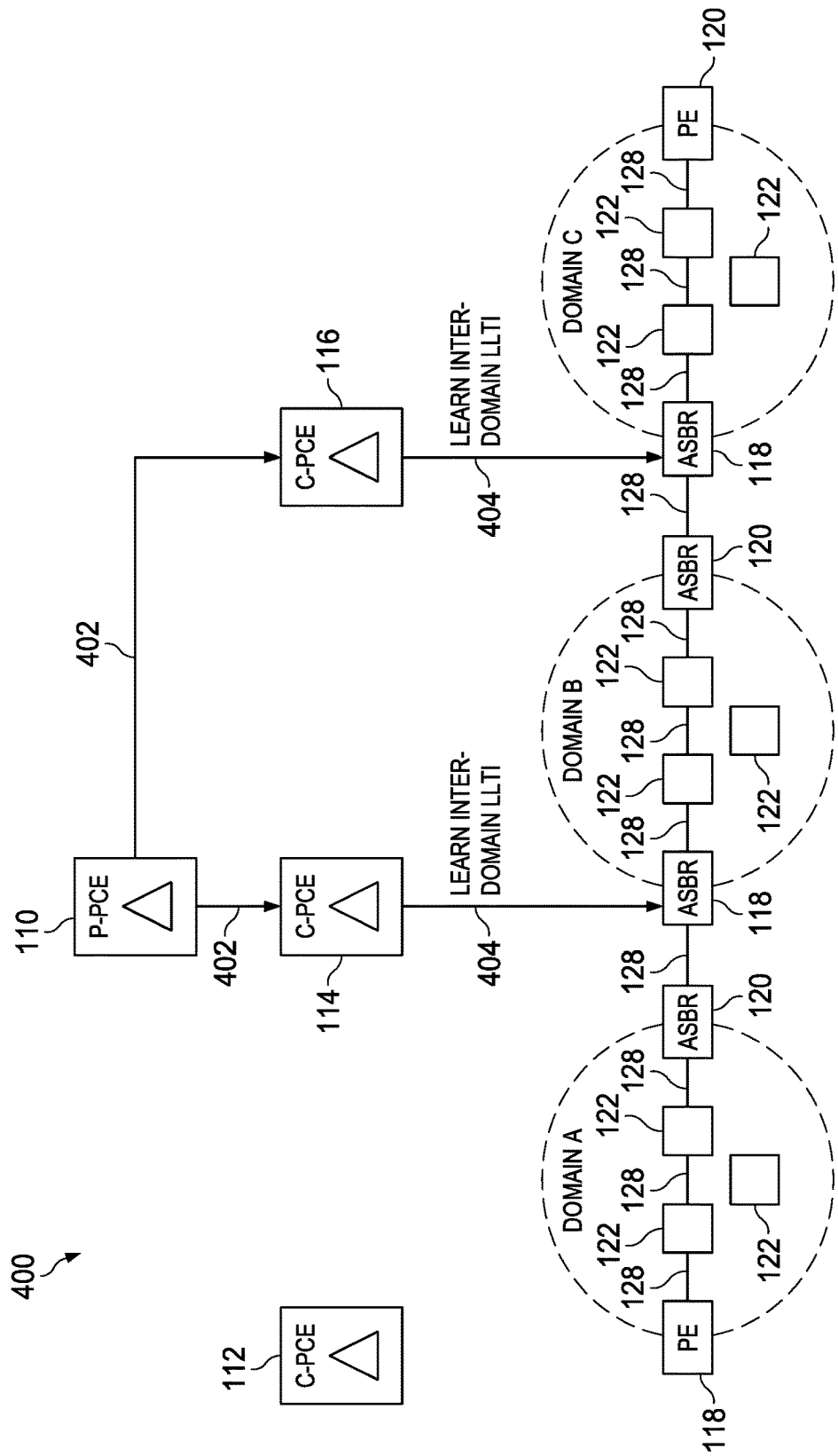
FIGS. 4A-4B collectively depict the manner in which inter-domain segments for the end-to-end tunnel are established.
Figure 4B:
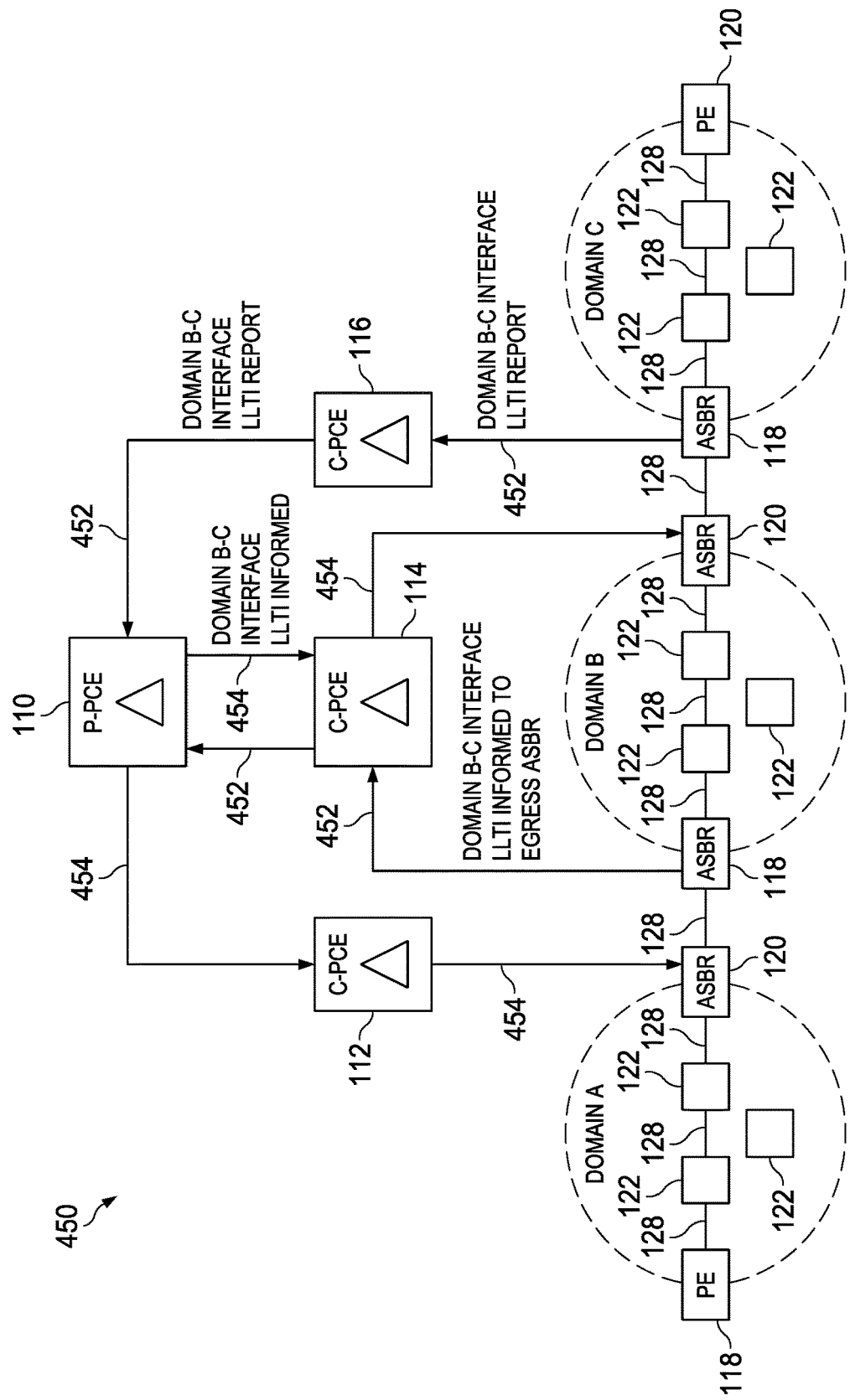

FIGS. 4A-4B illustrate embodiments of a hierarchical network 400, 450 similar to the hierarchical networks 100, 200, 300, 350 of FIGS. 1-2 and 3A-3B. FIGS. 4A-4B collectively depict the manner in which the inter-domain segments 132 of the E2E tunnel 102 of FIG. 1 are established from the perspective of the control plane. As shown in FIG. 4A, each child controller 112, 114, 116 receives a request 402 from the central controller 110 to learn an inter-domain LLTI. Because there is no inter-domain link upstream of the ingress network element 118 in domain A, the central controller 110 need not send the request 402 to the ingress network element 118. In an embodiment, the request 402 to learn the inter-domain LLTI and the request 302 to learn the intra-domain LLTI in FIG. 3A may be sent to each child controller 112, 114, 116 together in a single message or in separate messages sent simultaneously (e.g., within a few seconds, within a minute, etc.). In an embodiment, the child controller 112 may receive a single message containing both of the requests 302, 402, the child controller 114 may receive a single message containing both of the requests 302, 402, and the child controller 116 may receive a single message containing both of the requests 302, 402. If, for example, there is no inter-domain link upstream of the ingress network element 118 in domain A, the child controller 112 can ignore the request 402.

As shown in FIG. 4A, the child controller 114 sends an instruction 404 to generate the inter-domain LLTI to the ingress network element 118 in domain B and the child controller 116 sends an instruction 404 to generate the inter-domain LLTI to the ingress network element 118 in domain C. Upon receipt of the instruction 404, the ingress network element 118 in domain B generates the inter-domain LLTI for the link between domain A and domain B and the egress network element 120 in domain C generates the inter-domain LLTI for the link between domain B and domain C. In an embodiment, the ingress network element 118 stores the inter-domain LLTI that was generated.

As shown in FIG. 4B, the ingress network element 118 for domain B sends a report 452 containing the inter-domain LLTI to child controller 114 and the ingress network element 118 for domain C sends a report 452 containing the inter-domain LLTI to child controller 116. Once the inter-domain LLTI has been received, child controller 114 forwards the report 452 to the central controller 110 and child controller 116 forwards the report 452 to the central controller 110. Once the report 452 is received from each respective child controller 114, 116, the central controller 110 sends a message 454 containing the inter-domain LLTI for the link between domain A and domain B to the child controller 112. The central controller 110 also sends a message 454 containing the inter-domain LLTI for the link between domain B and domain C to the child controller 114. In an embodiment, the message is a PCInitiate message modified to carry the inter-domain LLTI (e.g., a PCEP extension). Additional details about a PCInitiate message are described in IETF RFC draft titled, "PCEP Extensions for PCE-initiated LSP Setup in a Stateful PCE Model," by E. Crabbe, et al., published on Jun. 10, 2017, which is incorporated herein by reference. In an embodiment, the central controller 110 sends the PCInitiate message to each child controller 112, 114, 116 once all stitching labels (e.g., inter-domain LLTIs) have been received.

Once the inter-domain LLTI for the link between domain A and domain B has been received, the child controller 112 forwards the message 454 to the egress network element 120 of domain A. Likewise, the child controller 114 forwards the message 454 to the egress network element 120 of domain B. Thereafter, each egress network element 120 is able to use the inter-domain LLTI that was received to route data packets over link between domains, which will be more fully explained below.

In an embodiment, the techniques described in FIG. 2 are used together with the intra-domain LLTI technique depicted in FIGS. 3A-3B and the inter-domain LLTI technique depicted in FIGS. 4A-4B in order to stitch together the E2E tunnel 102 and create the VN 104 illustrated in FIG. 1. In an embodiment, the techniques described in FIG. 2 may be carried out prior to the intra-domain LLTI technique depicted in FIGS. 3A-3B and the inter-domain LLTI technique depicted in FIGS. 4A-4B. In an embodiment, the intra-domain LLTI technique depicted in FIGS. 3A-3B and the inter-domain LLTI technique depicted in FIGS. 4A-4B may be performed at the same time, simultaneously (e.g., within a few seconds, within a minute, etc.), or sequentially.

Figure 5:
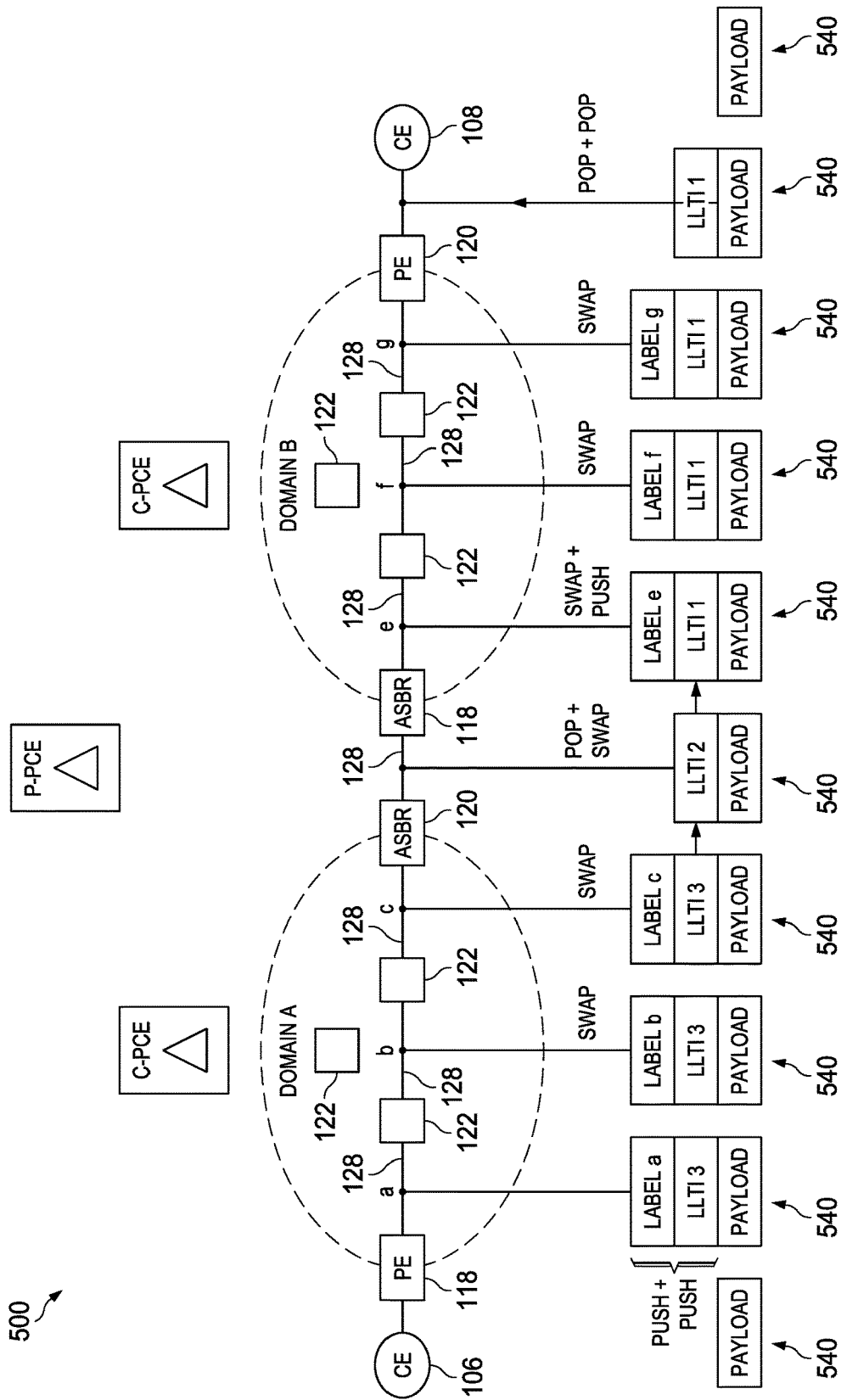
FIG. 5 depicts the manner in which data packets are routed through the hierarchical network using multiprotocol label switching routing techniques.

FIG. 5 illustrates an embodiment of a hierarchical network 500 similar to the hierarchical networks 100, 200, 300, 350, 400, 450 of FIGS. 1-2, 3A-3B, and 4A-4B. FIG. 5 depicts the manner in which data packets are routed through the hierarchical network 500 using an intra-domain LLTI (FIGS. 3A-3B), an inter-domain LLTI (FIGS. 4A-4B), and multiprotocol label switching (MPLS) routing techniques. Therefore, FIG. 5 represents the functionality of the data plane.

As shown in FIG. 5, the endpoint 106 transmits a data packet 540 containing a payload to the ingress network element 118 of domain A. The ingress network element 118 of domain A performs a "push+push" operation to add an MPLS label, designated "label a", to the data packet 540 and to add an intra-domain label, designated "LLTI 3", to the data packet 540. The data packet 540 is then propagated from the ingress network element 118 of domain A to the intermediate network element 122 over the path segment 128 corresponding to "label a". The intermediate network element 122 performs a swap operation to replace "label a" with "label b" in the data packet 540. The intra-domain label LLTI 3 remains the same. The data packet 540 is then propagated from the intermediate network element 122 to the next intermediate network element 122 over the path segment 128 corresponding to "label b". The intermediate network element 122 performs a swap operation to replace "label b" with "label c" in the data packet 540. Again, the intra-domain label LLTI 3 remains the same. The data packet 540 is then propagated from the intermediate network element 122 to the egress network element 120 over the path segment 128 corresponding to "label c".

The egress network element 120 of domain A performs a "pop+swap" operation to remove the MPLS label designated "label c" from the data packet 540 and to replace the intra-domain label LLTI 3 with the inter-domain label LLTI 2 in the data packet 540. The data packet 540 is then propagated from the egress network element 120 to the ingress network element 118 of domain B over the path segment 128 corresponding to the inter-domain label LLTI 2.

The ingress network element 118 of domain B performs a "swap+push" operation to add the MPLS label designated "label e" to the data packet 540 and to replace the inter-domain label LLTI 2 with the intra-domain label LLTI 1 in the data packet 540. The data packet 540 is then propagated from the ingress network element 118 of domain B to the intermediate network element 122 over the path segment 128 corresponding to "label e".

The intermediate network element 122 performs a swap operation to replace "label e" with "label f" in the data packet 540. The intra-domain label LLTI 1 remains the same. The data packet 540 is then propagated from the intermediate network element 122 to the next intermediate network element 122 over the path segment 128 corresponding to "label f". The intermediate network element 122 performs a swap operation to replace "label f" with "label g" in the data packet 540. The intra-domain label LLTI 1 remains the same. The data packet 540 is then propagated from the intermediate network element 122 to egress network element 120 over the path segment 128 corresponding to "label g".

The egress network element 120 performs a "pop+pop" operation to remove both "label g" and the intra-domain label LLTI 1 from the data packet 540. The data packet 540 is then propagated from the egress network element 120 of domain B to the endpoint 108. As such, the endpoint 108 is able to receive the payload originally transmitted by the endpoint 106. While two domains are illustrated in FIG. 5, it should be appreciated that additional domains may be utilized in propagating the data packet 540 from the endpoint 106 to the endpoint 108 in practical applications.

Figure 6:
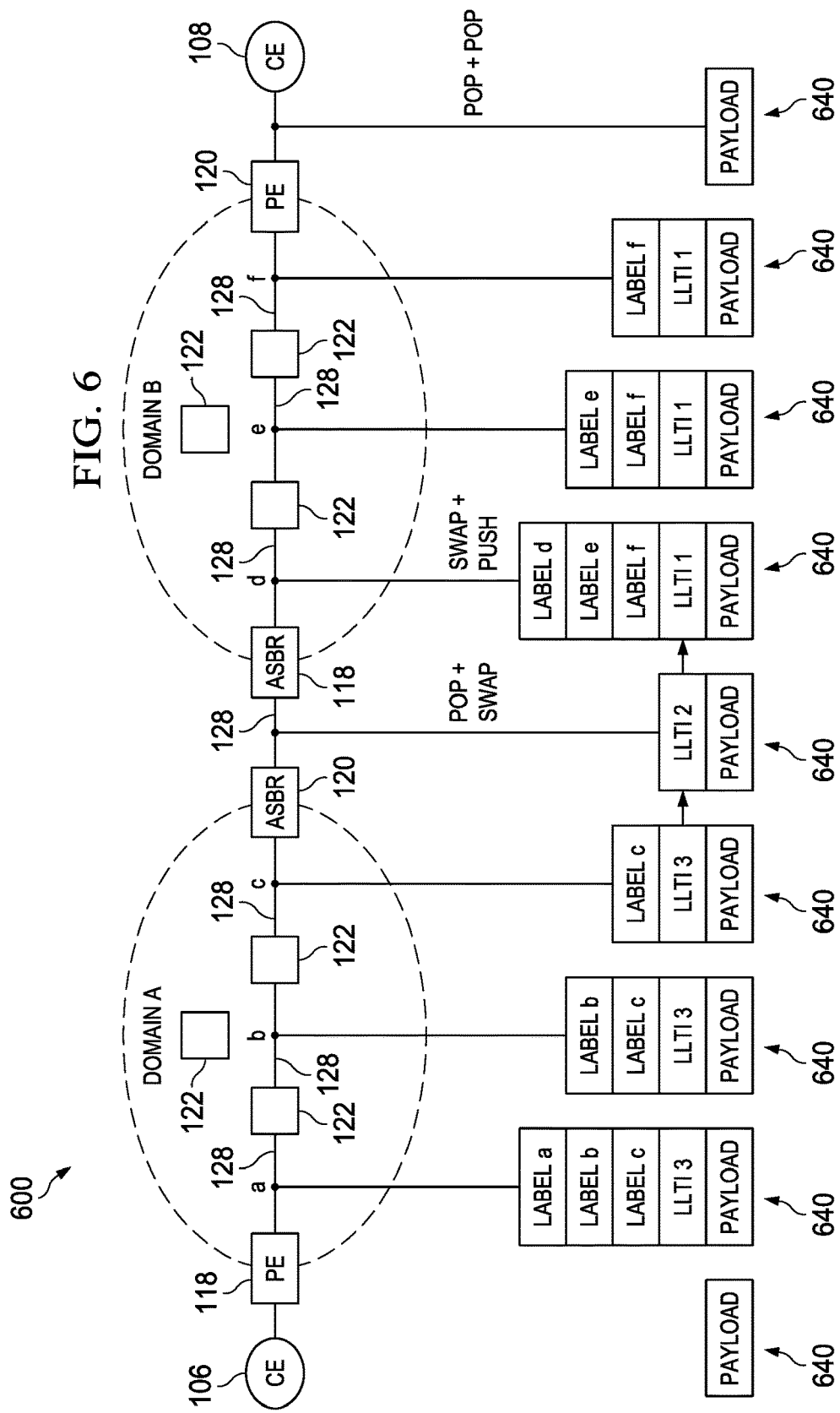
FIG. 6 depicts the manner in which data packets are routed through the hierarchical network using segment routing techniques.

FIG. 6 illustrates an embodiment of a hierarchical network 600 similar to the hierarchical networks 100, 200, 300, 350, 400, 450, 500 of FIGS. 1-2, 3A-3B, 4A-4B, and 5. FIG. 6 depicts the manner in which data packets are routed through the hierarchical network 600 using an intra-domain LLTI (FIGS. 3A-3B), an inter-domain LLTI (FIGS. 4A-4B), and segment routing techniques. Therefore, FIG. 6 represents the functionality of the data plane.

As shown in FIG. 6, the endpoint 106 transmits a data packet 640 containing a payload to the ingress network element 118 of domain A. The ingress network element 118 of domain A performs a push operation to add intra-domain label LLTI 3 and the MPLS labels used to transit the entire domain, namely "label a", "label b", and "label c" to the data packet 640. The data packet 640 is then propagated from the ingress network element 118 of domain A to the intermediate network element 122 over the path segment 128 corresponding to "label a". The intermediate network element 122 performs a pop operation to remove "label a" from the data packet 640. The intra-domain label LLTI 3 remains the same. The data packet 640 is then propagated from the intermediate network element 122 to the next intermediate network element 122 over the path segment 128 corresponding to "label b". The intermediate network element 122 performs a pop operation to remove "label b" from the data packet 640. Again, the intra-domain label LLTI 3 remains the same. The data packet 640 is then propagated from the intermediate network element 122 to the egress network element 120 over the path segment 128 corresponding to "label c".

The egress network element 120 of domain A performs a "pop+swap" operation to remove the MPLS label designated "label c" from the data packet 640 and to replace the intra-domain label LLTI 3 with the inter-domain label LLTI 2 in the data packet 640. The data packet 640 is then propagated from the egress network element 120 to the ingress network element 118 of domain B over the path segment 128 corresponding to the inter-domain label LLTI 2.

The ingress network element 118 of domain B performs a "swap+push" operation to add the MPLS labels designated "label d", "label e", and "label f" to the data packet 640 and to replace the inter-domain label LLTI 2 with the intra-domain label LLTI 1 in the data packet 640. The data packet 640 is then propagated from the ingress network element 118 of domain B to the intermediate network element 122 over the path segment 128 corresponding to "label d".

The intermediate network element 122 performs a swap operation to replace "label d" with "label e" in the data packet 640. The intra-domain label LLTI 1 remains the same. The data packet 640 is then propagated from the intermediate network element 122 to the next intermediate network element 122 over the path segment 128 corresponding to "label e". The intermediate network element 122 performs a swap operation to replace "label e" with "label f" in the data packet 640. The intra-domain label LLTI 1 remains the same. The data packet 640 is then propagated from the intermediate network element 122 to egress network element 120 over the path segment 128 corresponding to "label f".

The egress network element 120 performs a "pop+pop" operation to remove both "label f" and the intra-domain label LLTI 1 from the data packet 640. The data packet 640 is then propagated from the egress network element 120 of domain B to the endpoint 108. As such, the endpoint 108 is able to receive the payload originally transmitted by the endpoint 106. While two domains are illustrated in FIG. 6, it should be appreciated that additional domains may utilized in propagating the data packet 640 from the endpoint 106 to the endpoint 108 in practical applications.

Figure 7:
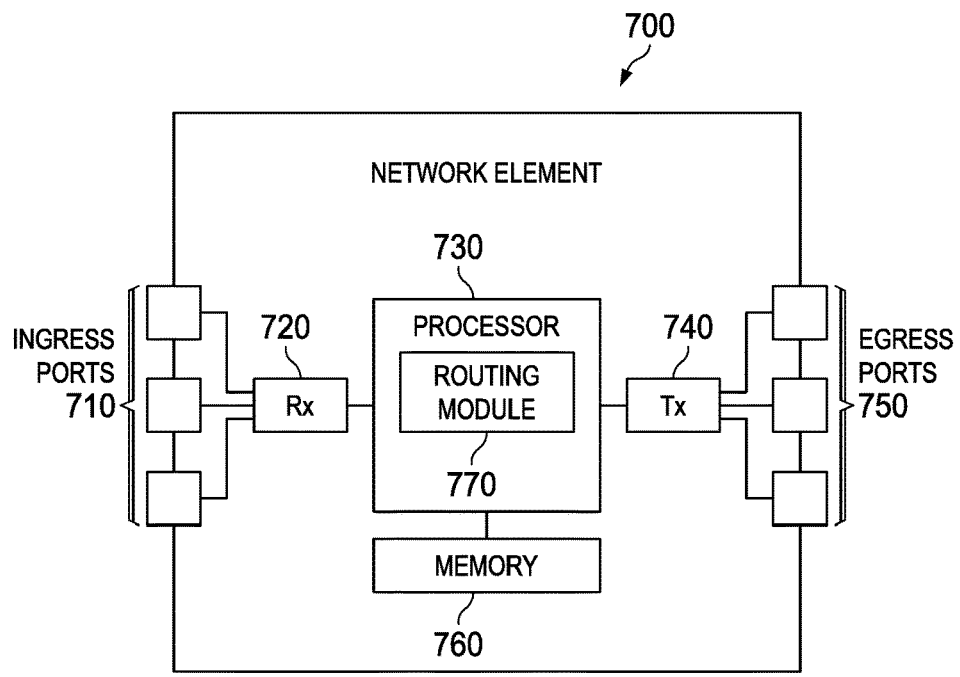
FIG. 7 is a schematic diagram of a network element.

FIG. 7 is a schematic diagram of a network element 700 according to an embodiment of the disclosure (e.g., ingress network element, egress network element, network controller element). The network element 700 is suitable for implementing the disclosed embodiments as described herein. The network element 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The network element 700 may also comprise optical-to-electrical (OE) components and electrical-to-optical (EO) components coupled to the ingress ports 710, the receiver units 720, the transmitter units 740, and the egress ports 750 for egress or ingress of optical or electrical signals.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the ingress ports 710, receiver units 720, transmitter units 740, egress ports 750, and memory 760. The processor 730 comprises a routing module 770. The routing module 770 implements the disclosed embodiments described above. For instance, the routing module 770 generates the LLTI and facilitates routing of the data packets using the LLTI. The inclusion of the routing module 770 therefore provides a substantial improvement to the functionality of the network element 700 and effects a transformation of the network element 700 to a different state. Alternatively, the routing module 770 is implemented as instructions stored in the memory 760 and executed by the processor 730.

The memory 760 comprises one or more disks, tape drives, and solid-state drives and may be used as an overflow data storage device, to store programs when such programs are selected for execution, and to store instructions and data that are read during program execution. The memory 760 may be volatile and non-volatile and may be read-only memory (ROM), random-access memory (RAM), ternary content-addressable memory (TCAM), and static random-access memory (SRAM).

Figure 8:
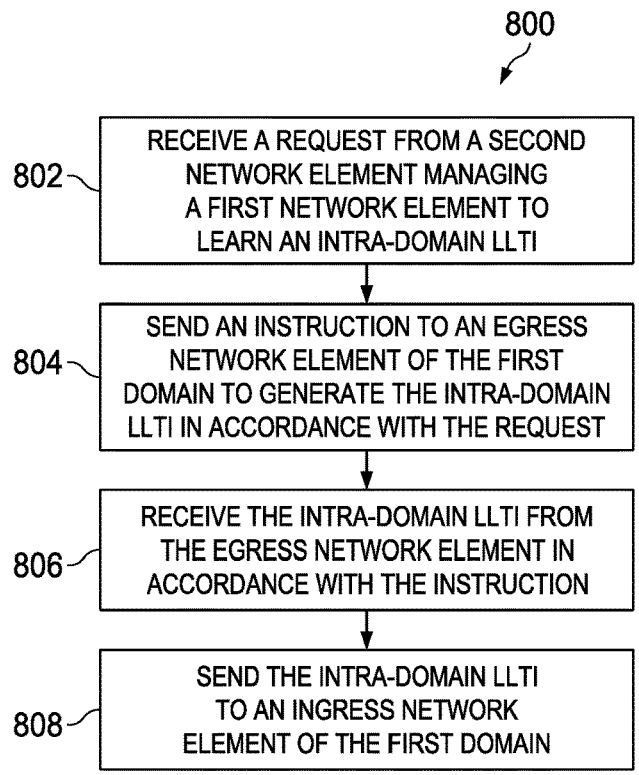
FIG. 8 is a method of establishing an end-to-end tunnel for a virtual network extending across multiple domains.

FIG. 8 is a method 800 of establishing an E2E tunnel for a VN extending across multiple domains (e.g., domain A, domain B, and domain C) using a first network controller element (e.g., a C-PCE, a PNC, etc.) managing a first domain (e.g., domain C). The method 800 may be performed when data packets are to be transmitted from one endpoint to another endpoint (e.g., endpoint 106 to endpoint 108) using the E2E tunnel through the VN. In step 802, a request is received from a second network controller element (e.g., a P-PCE, an MDSC, etc.) managing the first network controller element to learn an intra-domain LLTI. In an embodiment, the request includes an identifier corresponding to the E2E tunnel. In step 804, an instruction is sent to an egress network element (e.g., egress network element 120) of the first domain to generate the intra-domain LLTI in accordance with the request. In step 806, the intra-domain LLTI is received from the egress network element in accordance with the instruction. In step 808, the intra-domain LLTI is sent to an ingress network element (e.g., ingress network element 118) of the first domain. As noted in detail above, the intra-domain LLTI is then utilized in propagating the data packet.

Figure 9:
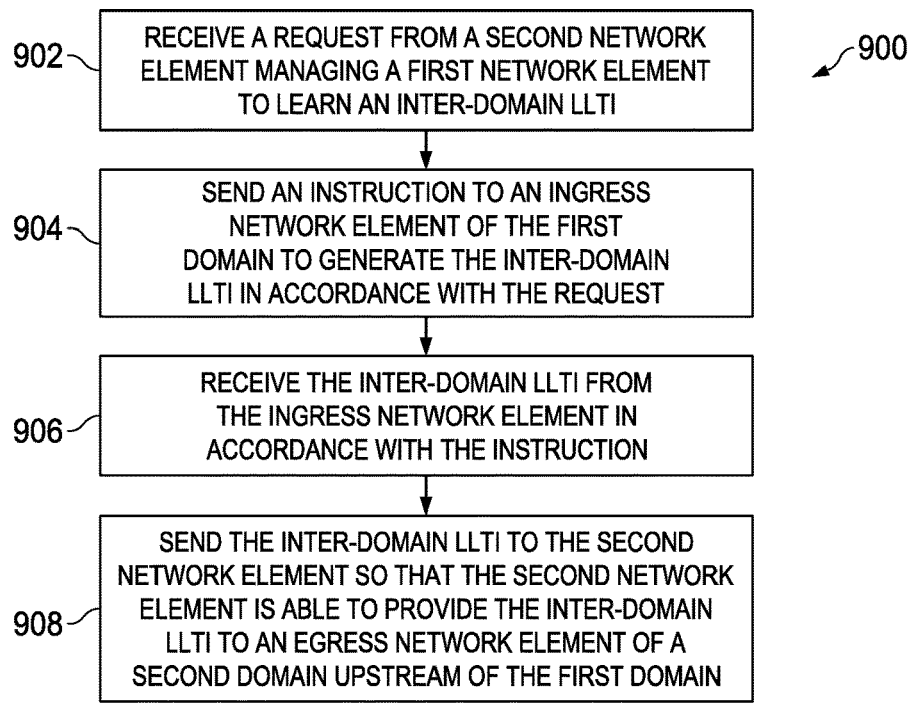
FIG. 9 is a method of establishing an end-to-end tunnel for a virtual network extending across multiple domains.

FIG. 9 is a method 900 of establishing an E2E tunnel for a VN extending across multiple domains (e.g., domain A, domain B, and domain C) using a first network controller element (e.g., a C-PCE, a PNC, etc.) managing a first domain (e.g., domain C). The method 900 may be performed when data packets are to be transmitted from one endpoint to another endpoint (e.g., endpoint 106 to endpoint 108) using the E2E tunnel through the VN. At step 902, a request is received from a second network controller element (e.g., a P-PCE, an MDSC, etc.) managing the first network controller element to learn an inter-domain LLTI. In an embodiment, the request includes an identifier corresponding to the E2E tunnel. At step 904, an instruction is sent to an ingress network element (e.g., ingress network element 118) of the first domain to generate the inter-domain LLTI in accordance with the request. At step 906, the inter-domain LLTI is received from the ingress network element in accordance with the instruction. At step 908, the inter-domain LLTI is sent to the second network controller element so that the second network controller element is able to provide the inter-domain LLTI to an egress network element (e.g., egress network element 120) of a second domain (e.g., domain B) upstream of the first domain. As noted in detail above, the inter-domain LLTI is then utilized in propagating the data packet.

Figure 10:
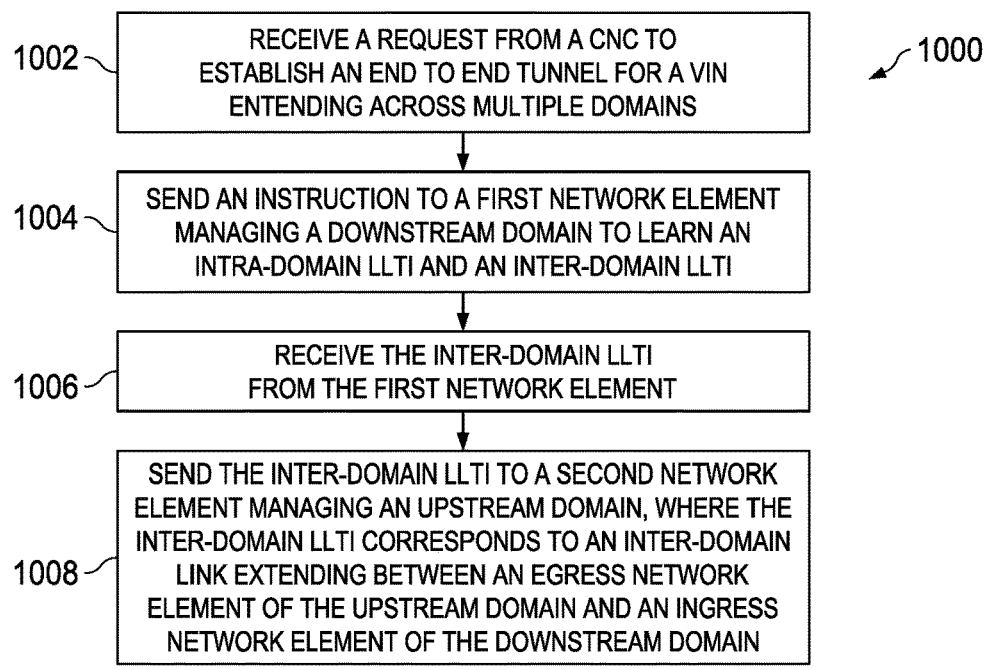
FIG. 10 is a method of establishing an end-to-end tunnel for a virtual network extending across multiple domains.

FIG. 10 is a method 1000 is a method of establishing an E2E tunnel for a VN extending across multiple domains (e.g., domain A, domain B, and domain C) using a first network controller element (e.g., a P-PCE, an MDSC, etc.). The method 1000 may be performed when data packets are to be transmitted from one endpoint to another endpoint (e.g., endpoint 106 to endpoint 108) using the E2E tunnel through the VN. At step 1002, a request is received from a customer network controller (e.g., CNC 202) to establish the E2E tunnel for the VN extending across the multiple domains. At step 1004, an instruction is sent to a first network controller element (e.g., a C-PCE, a PNC, etc.) managing a downstream domain (e.g., domain C) to learn an intra-domain LLTI and an inter-domain LLTI. At step 1006, the inter-domain LLTI is received from the first network controller element. At step 1008, the inter-domain LLTI is sent to a second network controller element (e.g., (e.g., a C-PCE, a PNC, etc.) managing an upstream domain (e.g., domain B). The inter-domain LLTI corresponds to an inter-domain link extending between an egress network element (e.g., egress network element 120) of the upstream domain and an ingress network element (e.g., ingress network element 118) of the downstream domain.

In an embodiment, the first network controller element maps a VN ID and an AP ID provided by the customer network controller to determine the ingress network element for the end-to-end tunnel and the egress network element for the E2E tunnel. In an embodiment, the first network controller element determines a domain sequence (e.g., domain A, then domain B, then domain C) for the end-to-end tunnel based on topology information. In an embodiment, the domain sequence identifies the upstream domains and the downstream domains. As noted in detail above, the inter-domain LLTI and the intra-domain LLTI are then then utilized in propagating the data packet.

Figure 11:
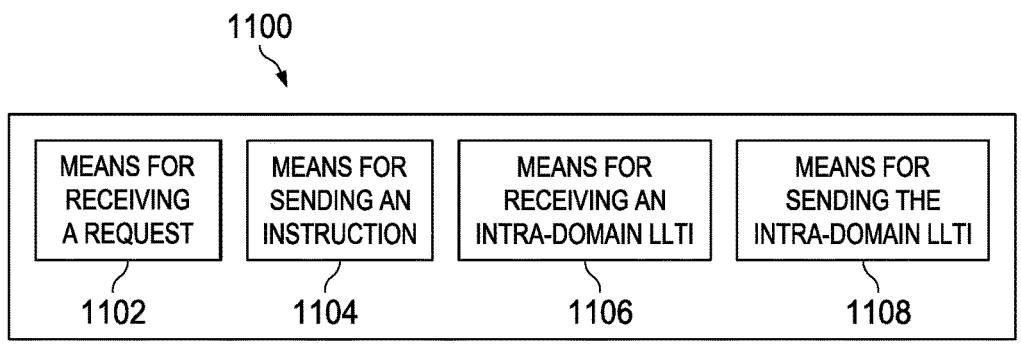
FIG. 11 is an apparatus configured to implement one or more of the methods disclosed herein.

FIG. 11 illustrates an apparatus 1100 configured to implement one or more of the methods described herein such as, for example, the method of establishing an end-to-end tunnel for a VN extending across multiple domains using a first network controller element (e.g., child controller 116) managing a first domain (e.g., domain C). The apparatus 1100 comprises means 1102 for receiving a request from a second network controller element managing the first network controller element to learn an intra-domain LLTI, means 1104 for sending an instruction to an egress network element of the first domain to generate the intra-domain LLTI in accordance with the request, means 1106 for receiving the intra-domain LLTI from the egress network element in accordance with the instruction, and means 1108 for sending the intra-domain LLTI to an ingress network element of the first domain.

Figure 12:
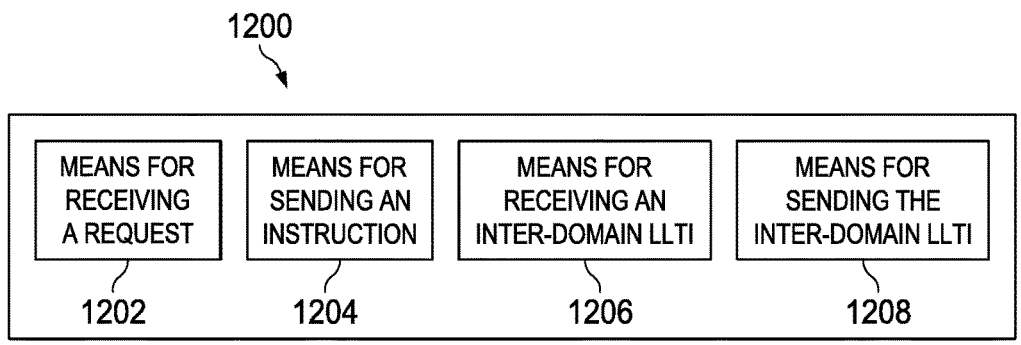
FIG. 12 is an apparatus configured to implement one or more of the methods disclosed herein.

FIG. 12 illustrates an apparatus 1200 configured to implement one or more of the methods described herein such as, for example, the method of establishing an end-to-end tunnel for a VN extending across multiple domains using a first network controller element (e.g., child controller 116) managing a first domain (e.g., domain C). The apparatus 1200 comprises means 1202 for receiving a request from a second network controller element (e.g., central controller 110) managing the first network controller element to learn an inter-domain LLTI, means 1204 for sending an instruction to an ingress network element (e.g., ingress network element 118) of the first domain to generate the inter-domain LLTI in accordance with the request, means 1206 for receiving the inter-domain LLTI from the ingress network element in accordance with the instruction, and means 1208 for sending the inter-domain LLTI to the second network controller element so that the second network controller element is able to provide the inter-domain LLTI to an egress network element (e.g., egress network element 120) of a second domain (e.g., domain B) upstream of the first domain.

Figure 13:
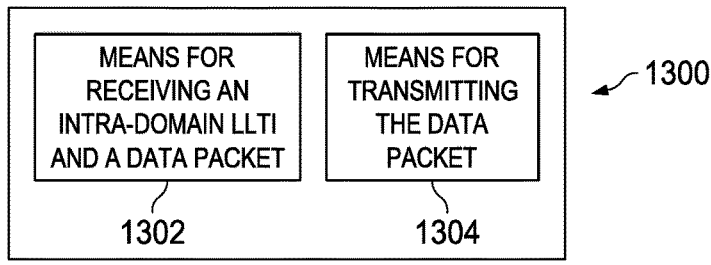
FIG. 13 is an apparatus configured to implement one or more of the methods disclosed herein.

FIG. 13 illustrates an apparatus 1300 (e.g., ingress network element 118) in a downstream domain (e.g., domain C) utilizing an end-to-end tunnel for a VN extending across multiple domains. The apparatus 1300 comprises means 1302 for receiving an intra-domain LLTI from a first network controller element (e.g., child controller 116) managing the downstream domain, where the intra-domain LLTI was generated by an egress network element (e.g., egress network element 120) in the downstream domain. The means 1302 for receiving is also configured to receive a data packet from an upstream egress network element (e.g., egress network element 120) in an upstream domain (e.g., domain B). The apparatus 1300 further comprises means 1304 for transmitting operably coupled to the means 1302 for receiving. The means 1304 for transmitting is configured to transmit the data packet toward the egress network element in the downstream domain using the intra-domain LLTI.

Figure 14:
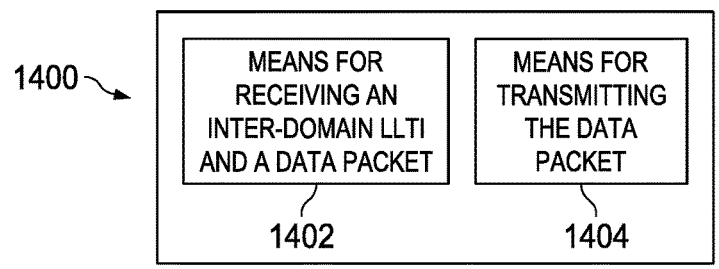
FIG. 14 is an apparatus configured to implement one or more of the methods disclosed herein.

FIG. 14 illustrates an apparatus 1400 (e.g., egress network element 120) in an upstream domain (e.g., domain B) utilizing an end-to-end tunnel for a VN extending across multiple domains. The apparatus 1400 comprises means 1402 for receiving an inter-domain LLTI from a first network controller element (e.g., child controller 114) managing the upstream domain, where the inter-domain LLTI was generated by an ingress network element (e.g., ingress network element 118) in a downstream domain (e.g., domain C). The means 1402 for receiving is also configured to receive a data packet from an intermediary network element (e.g., intermediary network element 122) in the upstream domain. The apparatus 1400 further comprises means 1404 for transmitting operably coupled to the means 1402 for receiving. The means 1404 for transmitting is configured to transmit the data packet to the ingress network element in the downstream domain using the inter-domain LLTI.

Figure 15:
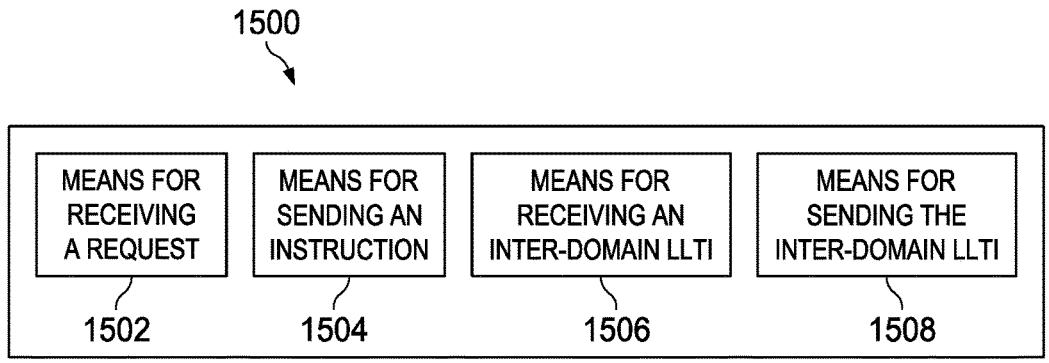
FIG. 15 is an apparatus configured to implement one or more of the methods disclosed herein.

FIG. 15 illustrates an apparatus 1500 configured to implement one or more of the methods described herein such as, for example, the method of establishing an end-to-end tunnel for a VN extending across multiple domains using a first network controller element (e.g., parent controller 110). The apparatus 1500 comprises means 1502 for receiving a request from a CNC to establish the end-to-end tunnel for the VN extending across the multiple domains, means 1504 for sending an instruction to a second network controller element (e.g., child controller 116) managing a downstream domain (e.g., domain C) to learn an intra-domain LLTI and an inter-domain LLTI, means 1506 for receiving the inter-domain LLTI from the second network controller element, and means 1508 for sending the inter-domain LLTI to a third network element (e.g., child controller 114) managing an upstream domain (e.g., domain B), where the inter-domain LLTI corresponds to an inter-domain link extending between an egress network element (e.g., egress network element 120) of the upstream domain and an ingress network element (e.g., ingress network element 118) of the downstream domain.

Figure 16:
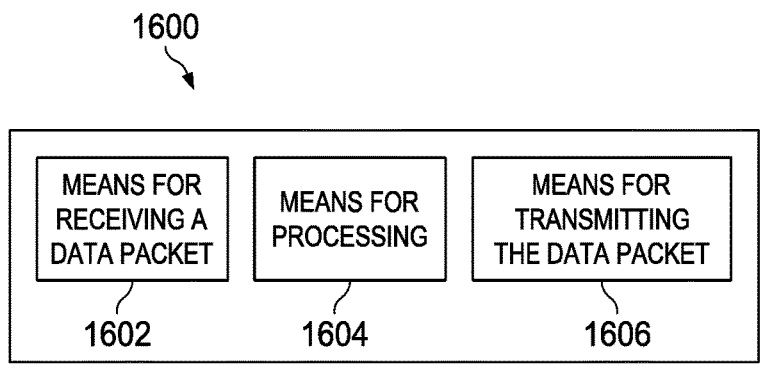
FIG. 16 is an apparatus configured to implement one or more of the methods disclosed herein.

FIG. 16 illustrates an apparatus 1600 (e.g., egress network element 120) in an upstream domain (e.g., domain B) utilizing an end-to-end tunnel for a VN extending across multiple domains. The apparatus 1600 comprises means 1602 for receiving configured to receive a data packet from an intermediary network element (e.g., intermediary network element 122) in the upstream domain. The data packet includes an intra-domain LLTI and a payload. The apparatus 1600 further comprises means 1604 for processing operably coupled to the means 1602 for receiving. The means 1604 for processing is configured to remove an MPLS label from the data packet and replace the intra-domain LLTI in the data packet with an inter-domain LLTI. The apparatus 1600 further comprises means 1606 for transmitting operably coupled to the means 1604 for processing. The means 1606 for transmitting is configured to transmit the data packet over an inter-domain link to an ingress network element in a downstream domain using the inter-domain LLTI.

Figure 17:
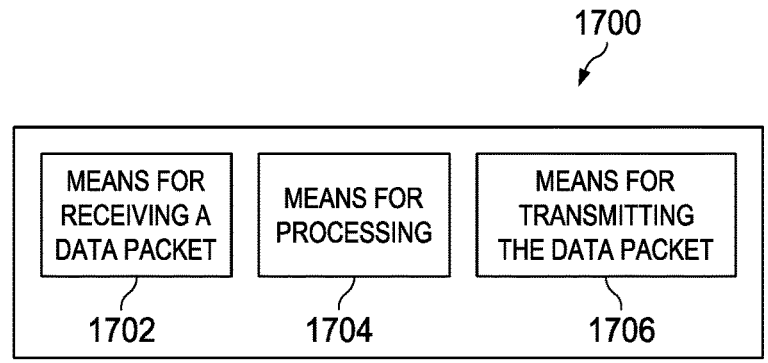
FIG. 17 is an apparatus configured to implement one or more of the methods disclosed herein.

FIG. 17 illustrates an apparatus 1700 (e.g., ingress network element 118) in a downstream domain (e.g., domain C) utilizing an end-to-end tunnel for a VN extending across multiple domains. The apparatus 1700 comprises means 1702 for receiving a data packet from an egress network element (e.g., upstream egress network element 120) in an upstream domain (e.g., domain B). The data packet includes an inter-domain LLTI and a payload. The apparatus 1700 further comprises means 1704 for processing operably coupled to the means 1702 for receiving. The means 1704 for processing is configured to add a MPLS label to the data packet and replace the inter-domain LLTI in the data packet with an intra-domain LLTI. The apparatus 1700 further comprises means 1706 for transmitting operably coupled to the means 1704 for processing. The means 1706 for transmitting is configured to transmit the data packet over an intra-domain link toward an egress network element in the downstream domain using the intra-domain LLTI.

In an embodiment, the present disclosure provides an egress network element in an upstream domain utilizing an end-to-end tunnel for a virtual network (VN) extending across multiple domains. The egress network element includes a receiver configured to receive a data packet from an intermediary network element in the upstream domain, wherein the data packet includes an intra-domain locally-learned tunnel identifier (LLTI) and a payload, a processor operably coupled to the receiver, wherein the processor is configured to remove a multiprotocol label switching (MPLS) label from the data packet, and replace the intra-domain LLTI in the data packet with an inter-domain LLTI, and a transmitter operably coupled to the processor, wherein the transmitter is configured to transmit the data packet over an inter-domain link to an ingress network element in a downstream domain using the inter-domain LLTI.

In an embodiment, the present disclosure provides an ingress network element in a downstream domain utilizing an end-to-end tunnel for a virtual network (VN) extending across multiple domains. The ingress network element includes a receiver configured to receive a data packet from an egress network element in an upstream domain, wherein the data packet includes an inter-domain locally-learned tunnel identifier (LLTI) and a payload, a processor operably coupled to the receiver, wherein the processor is configured to add a multiprotocol label switching (MPLS) label to the data packet, and replace the inter-domain LLTI in the data packet with an intra-domain LLTI, and a transmitter operably coupled to the processor, wherein the transmitter is configured to transmit the data packet over an intra-domain link toward an egress network element in the downstream domain using the intra-domain LLTI.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method to support establishing an end-to-end tunnel for a virtual network (VN) extending across multiple domains using a first network controller element managing a first domain, comprising:
receiving a request from a second network controller element managing the first network controller element for an intra-domain locally-learned tunnel identifier (LLTI);
sending, to an egress network element of the first domain, an instruction to generate the intra-domain LLTI in accordance with the request;
receiving the intra-domain LLTI from the egress network element in accordance with the instruction; and
sending the intra-domain LLTI to an ingress network element of the first domain to permit the ingress network element to propagate data packets through the first domain.

2. The method of claim 1, wherein the first network controller element is a child path computational element (C-PCE) and the second network controller element is a parent path computational element (P-PCE).

3. The method of claim 1, wherein the first network controller element is a provider network controller (PNC) and the second network controller element is a multi-domain service coordinator (MDSC).

4. The method of claim 1, wherein the egress network element is a provider edge (PE) coupled to a customer edge (CE).

5. The method of claim 1, wherein the ingress network element is an autonomous system boundary router (ASBR) coupled by an inter-domain link to an egress ASBR in a second domain upstream from the first domain.

6. The method of claim 1, wherein the request includes an identifier corresponding to the end-to-end tunnel.

7. The method of claim 1, wherein the intra-domain LLTI is received in a PCReport message modified to carry the intra-domain LLTI.

8. The method of claim 1, wherein the first network controller element sends a second instruction to the ingress network element of the first domain to generate an inter-domain LLTI.

9. A method to support establishing an end-to-end tunnel for a virtual network (VN) extending across multiple domains using a first network controller element managing a first domain, comprising:
receiving a request from a second network controller element managing the first network controller element for an inter-domain locally-learned tunnel identifier (LLTI);
sending, to an ingress network element of the first domain, an instruction to generate the inter-domain LLTI in accordance with the request;
receiving, from the ingress network element, the inter-domain LLTI in accordance with the instruction; and
sending, to the second network controller element, the inter-domain LLTI so that the second network controller element is able to provide the inter-domain LLTI to an egress network element of a second domain upstream of the first domain to permit data packets to be propagated between the first domain and the second domain.

10. The method of claim 9, wherein the first network controller element is a child path computational element (C-PCE) and the second network controller element is a parent path computational element (P-PCE).

11. The method of claim 9, wherein the first network controller element is a provider network controller (PNC) and the second network controller element is a multi-domain service coordinator (MDSC).

12. The method of claim 9, wherein the ingress network element is an autonomous system boundary router (ASBR) coupled by an inter-domain link to the egress network element of the second domain.

13. The method of claim 9, wherein the egress network element of the second domain is an autonomous system boundary router (ASBR) coupled by an inter-domain link to the ingress network element of the first domain.

14. The method of claim 9, wherein the request includes an identifier corresponding to the end-to-end tunnel.

15. The method of claim 9, wherein the first network controller element sends a second instruction to a first domain egress network element to generate an intra-domain LLTI.

16. An ingress network element in a downstream domain utilizing an end-to-end tunnel for a virtual network (VN) extending across multiple domains, comprising:
a receiver configured to receive:
an intra-domain locally-learned tunnel identifier (LLTI) from a first network controller element managing the downstream domain, wherein the intra-domain LLTI was generated by an egress network element in the downstream domain; and
a data packet from an upstream egress network element in an upstream domain; and
a transmitter operably coupled to the receiver, wherein the transmitter is configured to transmit the data packet toward the egress network element in the downstream domain using the intra-domain LLTI.

17. The ingress network element of claim 16, wherein the data packet is transmitted toward the egress network element in the downstream domain over an intra-domain link.

18. The ingress network element of claim 17, wherein the data packet is received from the upstream egress network element in the upstream domain over an inter-domain link.

19. The ingress network element of claim 18, wherein the intra-domain LLTI is received in a PCReport message modified to carry the intra-domain LLTI.

20. An egress network element in an upstream domain utilizing an end-to-end tunnel for a virtual network (VN) extending across multiple domains, comprising:
a receiver configured to receive:
an inter-domain locally-learned tunnel identifier (LLTI) from a first network controller element managing the upstream domain, wherein the inter-domain LLTI was generated by an ingress network element in a downstream domain; and a data packet from an intermediary network element in the upstream domain; and a transmitter operably coupled to the receiver, wherein the transmitter is configured to transmit the data packet to the ingress network element in the downstream domain using the inter-domain LLTI.

21. The egress network element of claim 20, wherein the data packet is transmitted to the ingress network element over an inter-domain link.

22. The egress network element of claim 20, wherein the data packet is received from the egress network element over an intra-domain link.

23. The egress network element of claim 20, wherein the inter-domain LLTI is received in a modified version of a PCInitiate message.

24. A method of establishing an end-to-end tunnel for a virtual network (VN) extending across multiple domains using a first network controller element, comprising:

receiving a request from a customer network controller (CNC) to establish the end-to-end tunnel for the VN extending across the multiple domains;

sending an instruction to a second network controller element managing a downstream domain to obtain an intra-domain LLTI and an inter-domain LLTI;

receiving the inter-domain LLTI from the second network controller element;

sending the inter-domain LLTI to a third network element managing an upstream domain, wherein the inter-domain LLTI corresponds to an inter-domain link extending between an egress network element of the upstream domain and an ingress network element of the downstream domain to permit data packets to be propagated between the egress network element of the upstream domain and the ingress network element of the downstream domain.

25. The method of claim 24, further comprising mapping a virtual network identifier (VN ID) and an access point (AP) identifier provided by the CNC to determine an ingress provider edge (PE) and an egress PE for the VN.

26. The method of claim 24, further comprising determining a domain sequence for the end-to-end tunnel based on topology information, wherein the domain sequence identifies the upstream domain and the downstream domain.

* * * * *